(12) United States Patent
Okagaki et al.

(10) Patent No.: US 9,625,803 B2
(45) Date of Patent: Apr. 18, 2017

(54) SCREEN, OPTICAL ELEMENT, AND DISPLAY DEVICE

(71) Applicant: MITSUBISHI ELECTRIC CORPORATION, Tokyo (JP)

(72) Inventors: Satoru Okagaki, Tokyo (JP); Jun Kondo, Tokyo (JP); Kuniko Kojima, Tokyo (JP); Yuzo Nakano, Tokyo (JP); Akihisa Miyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 91 days.

(21) Appl. No.: 14/376,291

(22) PCT Filed: Feb. 26, 2013

(86) PCT No.: PCT/JP2013/001083
§ 371 (c)(1),
(2) Date: Aug. 1, 2014

(87) PCT Pub. No.: WO2013/128883
PCT Pub. Date: Sep. 6, 2013

(65) Prior Publication Data
US 2015/0009569 A1    Jan. 8, 2015

(30) Foreign Application Priority Data

Feb. 27, 2012 (JP) ................. 2012-040266

(51) Int. Cl.
*G02B 5/02* (2006.01)
*G02B 13/20* (2006.01)
(Continued)

(52) U.S. Cl.
CPC ......... *G03B 21/608* (2013.01); *G02B 5/0242* (2013.01); *G02B 5/0284* (2013.01);
(Continued)

(58) Field of Classification Search
CPC .. G02F 1/167; G02F 1/1334; G02F 1/133504; G02F 1/19; G02B 5/0242;

(58) Field of Classification Search
CPC . G02B 1/06; G02B 5/02; G02B 13/20; G03B 21/608; G03B 21/625
See application file for complete search history.

(56) References Cited

U.S. PATENT DOCUMENTS

| 5,282,027 A | 1/1994 | Tanigaki et al. |
| 6,392,786 B1 * | 5/2002 | Albert ............... G02F 1/167 204/606 |
| 2004/0263965 A1 | 12/2004 | Honda |
| 2005/0007649 A1 * | 1/2005 | Kawai ............... B01J 13/02 359/296 |

(Continued)

FOREIGN PATENT DOCUMENTS

| CN | 102652272 A | 8/2012 |
| CN | 103119480 A | 5/2013 |

(Continued)

*Primary Examiner* — Bumsuk Won
*Assistant Examiner* — Balram Parbadia
(74) *Attorney, Agent, or Firm* — Birch, Stewart, Kolasch & Birch, LLP

(57) ABSTRACT

A screen is provided with microcapsules and a base material. The microcapsules each contain encapsulated liquid inside a capsule membrane. The microcapsules are planarly arranged on the base material. The encapsulated liquid includes light diffusion particles for scattering light, and a dispersion medium for dispersing the light diffusion particles. In a cross sectional area of the microcapsule projected in the direction perpendicular to the surface of the base material on which the microcapsules are planarly arranged, the ratio of the area of the encapsulated region to the area of the microcapsule ranges from 0.9025 to 0.990.

10 Claims, 9 Drawing Sheets

(51) Int. Cl.
*G03B 21/608* (2014.01)
*G03B 21/62* (2014.01)
*G02B 27/48* (2006.01)
*G02B 1/06* (2006.01)

(52) U.S. Cl.
CPC .......... *G02B 5/0294* (2013.01); *G02B 27/48* (2013.01); *G03B 21/62* (2013.01); *G02B 1/06* (2013.01)

(56) References Cited

U.S. PATENT DOCUMENTS

| | | | |
|---|---|---|---|
| 2009/0224660 A1* | 9/2009 | Nakanishi | H01L 51/5262 313/504 |
| 2010/0097685 A1* | 4/2010 | Kawase | G02F 1/167 359/290 |
| 2012/0224109 A1 | 9/2012 | Okagaki et al. | |

FOREIGN PATENT DOCUMENTS

| | | |
|---|---|---|
| EP | 0454244 A2 | 10/1991 |
| JP | 4-011485 A | 1/1992 |
| JP | 2005-017920 A | 1/2005 |
| JP | 2007-065398 A | 3/2007 |
| JP | 2007-081864 A | 3/2007 |
| JP | 2008-151912 A | 7/2008 |
| JP | 2008-151914 A | 7/2008 |
| JP | 2009-058662 A | 3/2009 |
| JP | 2011-170034 A | 9/2011 |
| WO | WO 2011/070777 A1 | 6/2011 |

* cited by examiner

SCREEN, OPTICAL ELEMENT, AND DISPLAY DEVICE

TECHNICAL FIELD

The present invention relates to a structure of a screen employed in a display device, etc.

DESCRIPTION OF THE RELATED ART

A projection display device such as a projector displays an image on a screen by projecting light rays emitted from a light source. However, the light rays scattered in a light diffusion layer of the screen where an image is projected interfere in a side of a viewer such as an audience. The interference causes glare to the viewer in the whole screen. Non-uniformity of brightness accompanied by the interference of light rays is called scintillation. There has been a problem that the scintillation degrades image quality.

In order to overcome the problem, Patent Document 1 discloses an optical element in which microcapsules are disposed on a supporting sheet. Each microcapsule contains inside dispersion liquid including light diffusion particles. Movement of the light diffusion particles in the microcapsule causes a temporal change in the interference of light, so that the scintillation is reduced.

PRIOR ART DOCUMENT

Patent Document

Patent Document 1: International Publication of Unexamined Application No. WO2011/070777

SUMMARY OF THE INVENTION

Problems to be Solved by the Invention

However, when a plurality of microcapsules are fixed on the screen, if the microcapsule film thickness is large, the ratio of the light emitted to particles inside the microcapsule decreases, and thus a problem arises that non-uniformity of brightness within a display area is generated. Conversely, if the microcapsule film thickness is small, the microcapsule is easy to break when fixed on the screen. There has been a problem that the non-uniformity of brightness is generated also when the microcapsule is broken.

The invention has been made to overcome the problems described above, and an object thereof is to reduce the non-uniformity of brightness within a display area in the screen where the microcapsules are fixed.

Means for Solving the Problems

A screen according to the invention is provided with microcapsules each including encapsulated liquid inside a capsule membrane; and a base material on which the microcapsules are planarly arranged; wherein the encapsulated liquid includes light diffusion particles that scatter light and a dispersion medium that disperses the light diffusion particles, and a ratio of an area of the encapsulated liquid region to an area of each of the microcapsules ranges from 0.9025 to 0.990 in a cross-sectional area of the microcapsule projected in a direction perpendicular to a surface of the base material on which the microcapsules are planarly arranged.

Effect of the Invention

With the invention, non-uniformity of brightness in a screen where microcapsules are fixed can be reduced.

EMBODIMENTS FOR CARRYING OUT THE INVENTION

Embodiment 1

Figure 1:
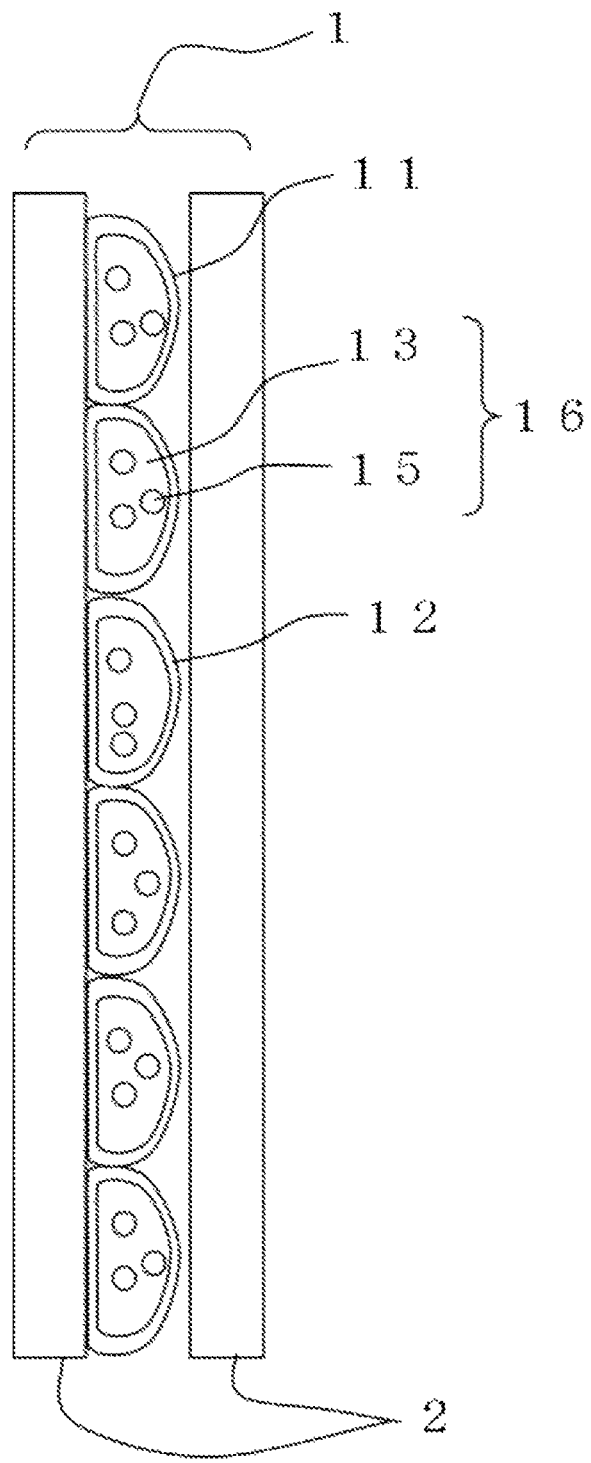
FIG. 1 is a configuration diagram of a screen according to Embodiment 1.

FIG. 1 is a configuration diagram of a screen 1 according to Embodiment 1. The screen 1 is configured such that microcapsules 11 are disposed between two sheets of transparent base materials 2. The microcapsules 11 each contain dispersion medium 13 and light diffusion particles 15 inside a capsule membrane 12a. The dispersion medium 13 and the light diffusion particles 15 are collectively defined to be encapsulated liquid 16. The microcapsule 11 contains the encapsulated liquid 16 inside the capsule membrane 12. The encapsulated liquid 16 includes the light diffusion particles 15 that scatter light and the dispersion medium 13 that disperses the light diffusion particles 15. A "radius a" is the radius of the microcapsule 11. A "radius b" is the radius of an encapsulated region defined by subtracting the thickness of the capsule membrane 12 from the "radius a". In the present configuration, it will be explained that setting the ratio, the "radius b" over the "radius a", to be between 0.95 and 0.995 enables reduction in the non-uniformity of brightness within the display area. When the ratio is expressed in terms of the area, the ratio is the "radius b" squared over the "radius a" squared. In the cross sectional area of the microcapsule 11 projected in the direction perpendicular to the plane of the base material 2 on which microcapsules 11 are planarly arrayed, the ratio of the area of the encapsulated region to the area of the microcapsule 11 ranges from 0.9025 to 0.990. Note that, "the encapsulated region" is a region inside the capsule membrane 12. That is, "the encapsulated region" is a region where the encapsulated liquid 16 exists.

Further, here in the explanation, it is assumed for simplification that parallel light almost vertical to the image display surface of the screen 1 is projected as image light, and the light penetrating the screen 1 is recognized as an image by the viewer. Note that, "image light" is light including image information.

Figure 2:
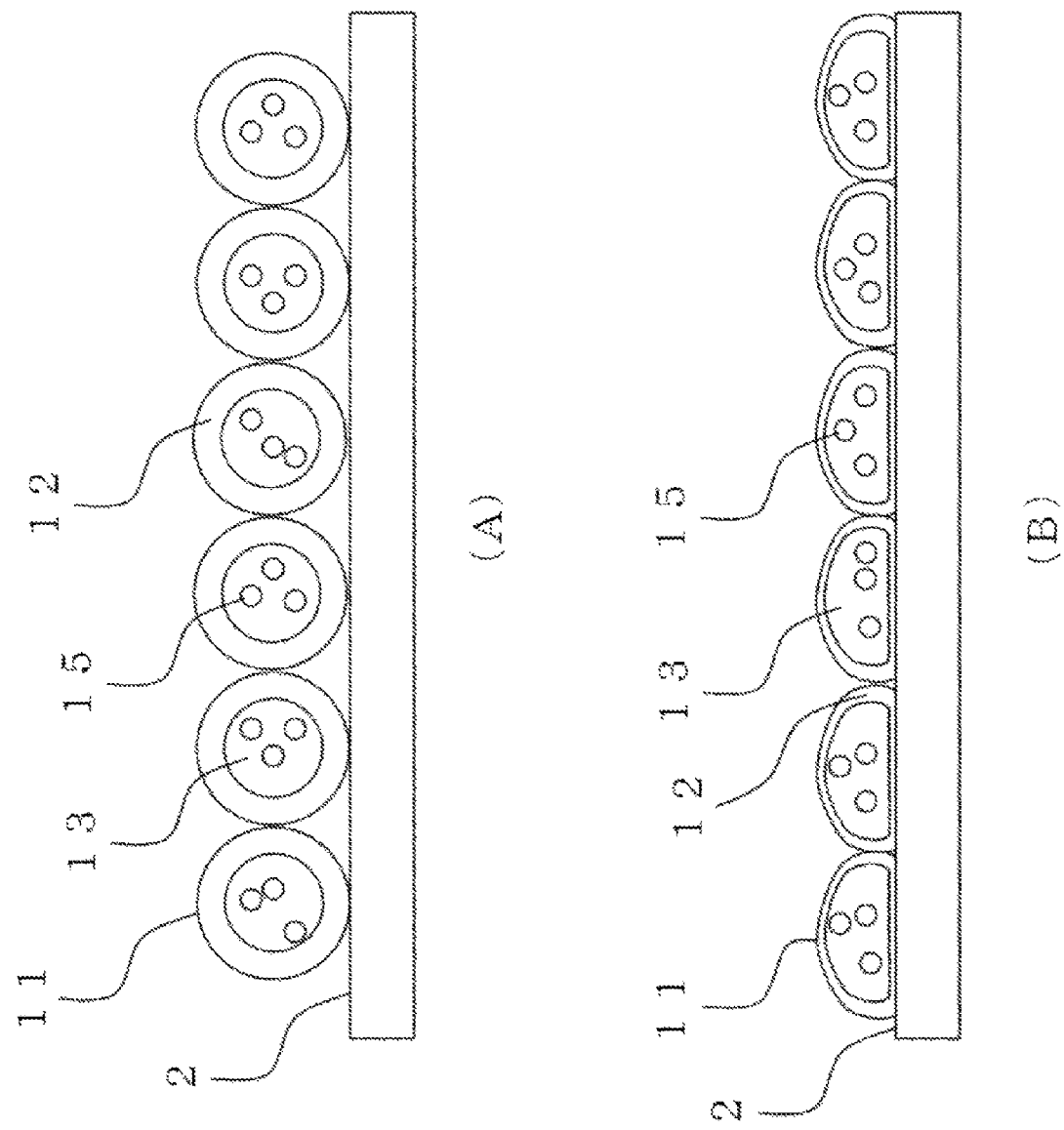
FIG. 2 includes schematic diagrams showing states of microcapsules on a transparent base material according to Embodiment 1.

A manufacturing method of the screen 1 will be explained. FIG. 2 is a schematic diagram showing a state of the microcapsules 11 on the transparent base material 2. FIG. 2 (A) shows a state in which the microcapsules 11 are applied on the transparent base material 2. FIG. 2 (B) shows a state after the microcapsules 11 and the transparent base material 2 are dried. As shown in FIG. 2 (A), ink including microcapsules 11 is uniformly spread on the surface of the transparent base material 2. The "ink" is a mixture of a binder material with the microcapsules 11. Note that, since the binder material may make the figure complicated, the binder material is omitted in FIG. 2. The microcapsules 11 are planarly arrayed on the transparent base material 2.

The microcapsules are divided into two types in terms of their manufacturing methods. The first is a water-based microcapsule and the second is an oil-based microcapsule. The water-based microcapsule is manufactured in a water-based dispersion medium. The oil-based microcapsule is manufactured in an oil-based dispersion medium.

For example, when the water-based microcapsule 11 is employed, the capsule membrane 12 retains much moisture. Further, a hydrophilic binder material is to be employed, and thus the ink contains much moisture. The state of the microcapsules in FIG. 2 (A) is changed into the state of FIG. 2 (B) by evaporating moisture and being dried. In the state of FIG. 2 (B), the microcapsule 11 is deformed in an ellipsoid owing to the gravity. This deformation of the microcapsules 11 is caused by the gravity when the microcapsules 11 are placed on the transparent base material 2. Furthermore, the moisture retained in the capsule membrane 12 of the microcapsule 11 evaporates, the capsule membrane 12 contracts, and then the microcapsules 11 are fixed on the transparent base material 2 with the binder material. Further, another sheet of transparent base material 2 is laminated from the upper side in FIG. 2 to produce the screen 1.

An example of producing the microcapsules 11 in the water-based dispersion medium will be explained. In this case, a coacervation method, a composite coacervation method, and an interfacial reaction method etc. are given as examples of manufacturing methods for the microcapsules 11. The capsule membrane 12 of the microcapsule 11 which is manufactured in the water-based dispersion medium contains moisture, and the moisture in the capsule membrane 12 is evaporated in a drying process. Thus, the capsule membrane 12 contracts in the dying process. Further, membrane materials of the microcapsule 11 are, for example, gelatin, a polymer of gelatin and gum arabic, etc. Because of this, the microcapsule 11 is easily deformed in the drying process, as shown in FIG. 2 (B).

The oil-based microcapsule 11 is manufactured in the oil-based dispersion medium. For example, an oil-based solvent such as isoparaffin is employed. In this case, as materials for the capsule membrane 12, resin, etc. that is cured by a polymerization initiator, at a certain temperature or with ultraviolet light are employed. Contraction of the capsule membrane 12 in the dying process described above does not occur in the oil-based microcapsule 11. Strictly speaking, resin can contract when cured; however, compared with the contraction amount due to evaporation of moisture, it is a negligible level.

As a material for the transparent base material 2, for example, resin or glass that has good translucency can be employed. This can bring about good optical transmission and transparency for the screen 1. As materials for the resin, polycarbonate, polyethylene terephthalate, polyethylene, acryl, or the like are considered.

Figure 3:
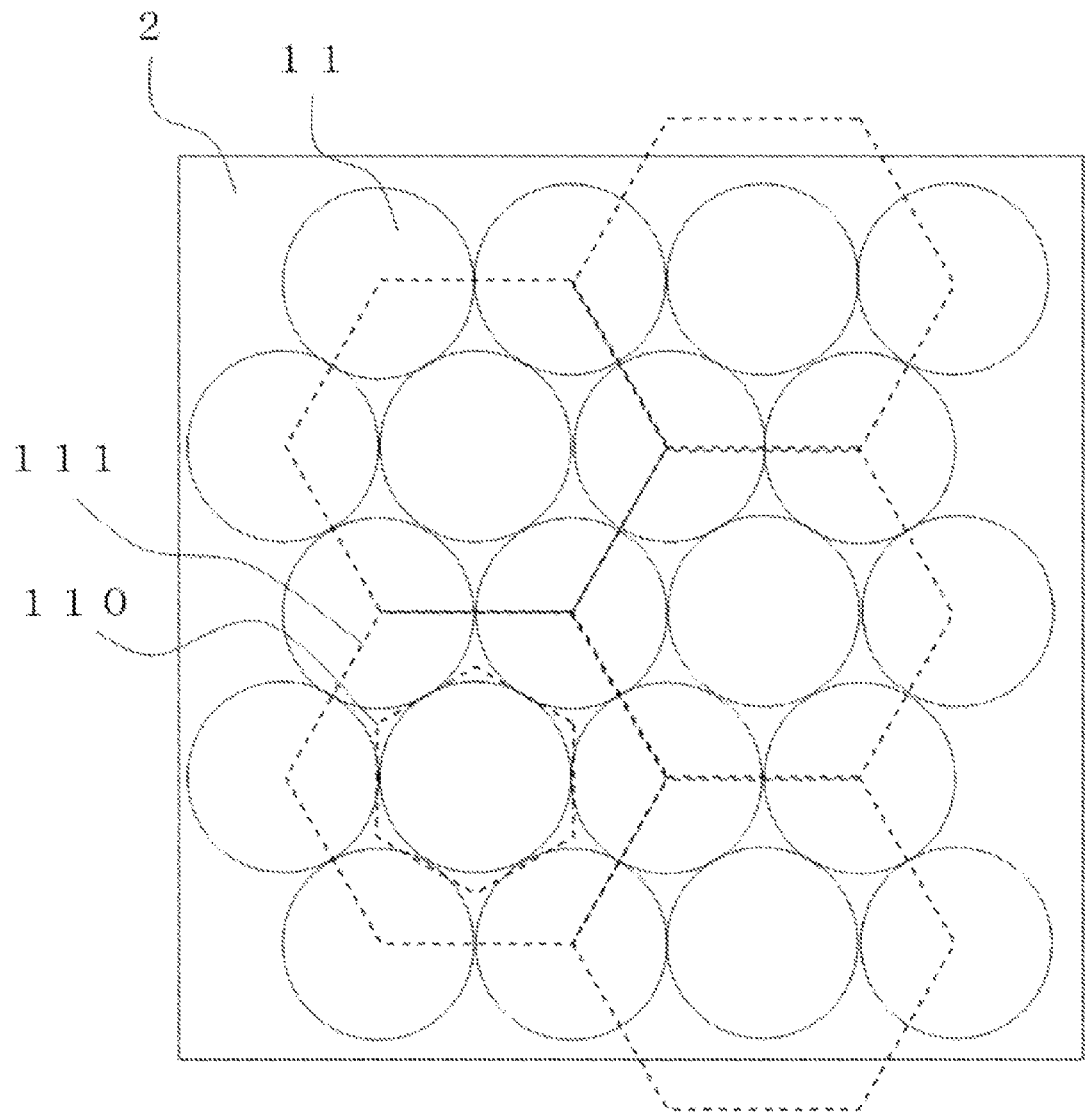
FIG. 3 is a schematic diagram showing a state of the microcapsules that are arranged uniformly on the transparent base material after they are dried, according to Embodiment 1.

Next, it will be explained that depending on the thickness of the capsule membrane 12 of the microcapsule 11 fixed on the surface of the transparent base material 2, a ratio of light emitted to the light diffusion particles 15 varies, resulting in the occurrence of the non-uniformity of brightness on the screen. FIG. 3 is a schematic diagram showing a state in which the microcapsules 11 are arranged uniformly on the surface of the transparent base material 2 after they are dried.

The arrangement of the microcapsules 11 shown in FIG. 3 is such that one of the microcapsules 11 is surrounded by six microcapsules 11. Six microcapsules 11 form a regular hexagon. By the arrangement of the microcapsules 11 as shown in FIG. 3, the spherical microcapsules 11 are arranged on the surface of the transparent base material 2 so as to minimize gaps among them.

The ink in which the microcapsules 11 are dispersed has fluidity, so that the microcapsules 11 are naturally arranged as shown in FIG. 3. Although the moisture in the capsule membrane 12 of the water-based microcapsule 11 is evaporated in the drying process, the arrangement of the microcapsules 11 is not changed in this drying process, and thus the microcapsules 11 are fixed in the arrangement shown in FIG. 3. Further, as noted above, the microcapsules 11 are dried while they are deformed under the gravity and deformed owing to the contraction of the capsule membrane 12. Thus the microcapsules 12 are deformed into an approximate hexagonal shape indicated by the broken line 110 in FIG. 3.

Assuming that the light diffusion particles 15 dispersed uniformly within the dispersion medium 13 exist uniformly on the surface of the transparent base material 2, the non-uniformity of brightness on the screen 1 is negligibly small. Conversely, assuming that there are no light diffusion particles 15 and no structures that diffuse light, the image light is not diffused in the screen 1 and penetrates therethrough. In this case, the viewer cannot recognize the image light as an image and observes extremely bright light. This means a situation where the viewer directly observes projection light to the screen 1, and is the same as a situation, for example, where the viewer observes a front projector so as to interrupt the light projected onto the screen from the front projector. That is, when there is an area on the screen 1 where light is not diffused, the viewer recognizes the area as being an extremely bright area and cannot recognize as an image the image light that penetrates the area where the light is not diffused.

Gaps created among the microcapsules 11 on the surface of the screen 1 are areas where light diffusion particles 15 do not exist. Further, the capsule membranes 12 themselves correspond to areas where light diffusion particles 15 do not exist. The image light emitted to these areas penetrates the screen 1 without striking the light diffusion particles 15. "These areas" mean the gaps that are created among the microcapsules 11, and the areas of capsule membranes 12. Therefore, these rays of image light are hardly diffused when reaching the viewer. Thus the viewer recognizes as extremely bright areas the areas corresponding to the gaps created among microcapsules 11 and the capsule membranes 12 themselves.

In contrast, the image light projected into the capsule membranes 12 of the microcapsules 11 is diffused by the light diffusion particles 15 and reaches the viewer, and the viewer recognizes the diffused image light as an image. In this way, when an area where the light is not diffused and an area where the light is diffused by the light diffusion particles 15 coexist in the display area of the screen 1, the viewer recognizes it as the non-uniformity of brightness on the screen 1.

The relationship between the ratio b/a of the microcapsule 11 and the non-uniformity of brightness on the screen will be explained. The "radius a" is the radius with respect to the external diameter of the microcapsule 11. The "radius b" of the encapsulated region is the radius defined by subtracting the membrane thickness from the "radius a" of the microcapsule 11. "The encapsulated region" is a region inside the capsule membrane 12. The "radius a" of the microcapsule 11 is the radius corresponding to half of the external diameter of the microcapsule 11.

Figure 4:
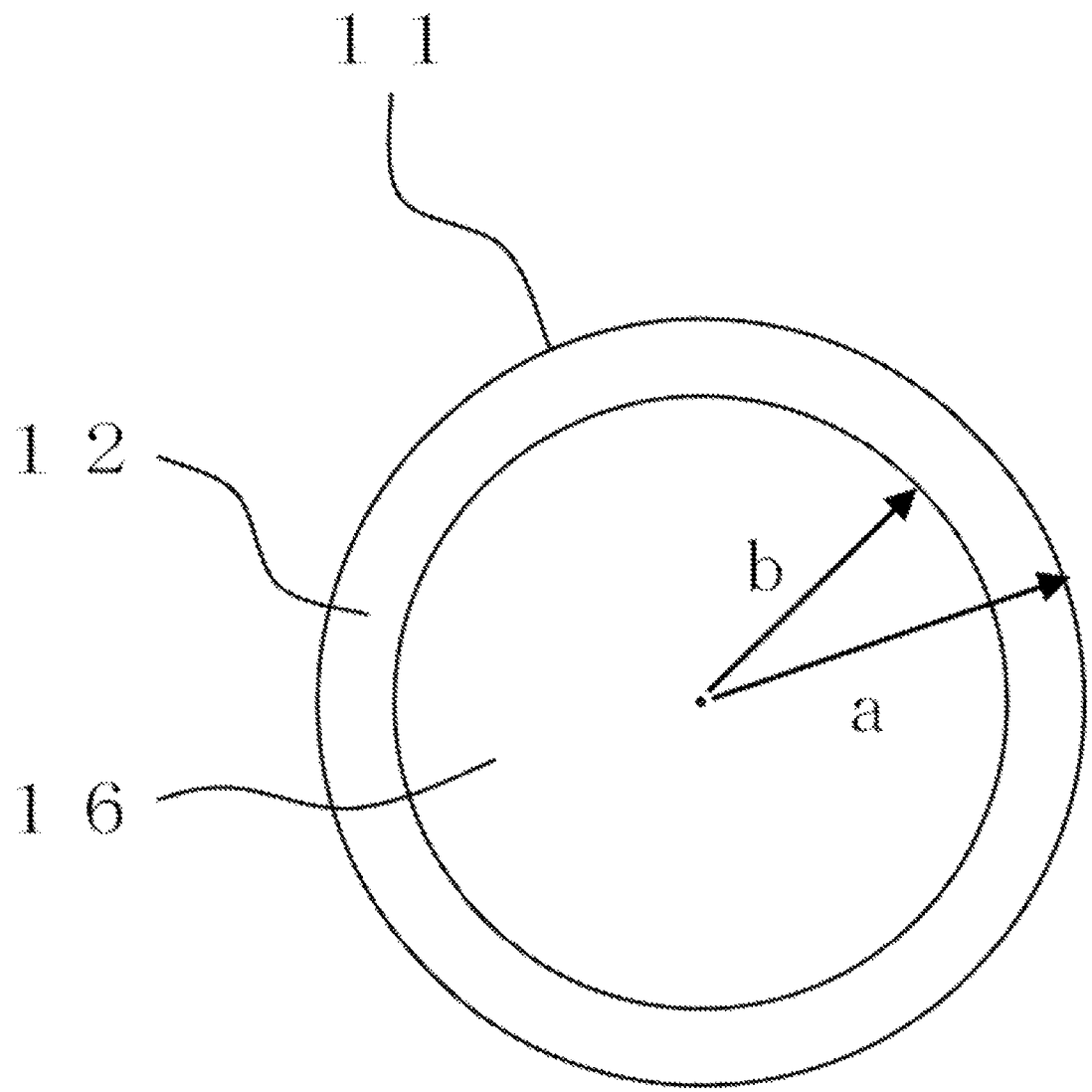
FIG. 4 is a schematic diagram showing a structure of each microcapsule according to Embodiment 1.

FIG. 4 is a schematic diagram showing a structure of the microcapsule 11. As shown in FIG. 4, the radius of the microcapsule 11 is the "radius a". The "radius b" is the radius defined by subtracting the thickness of the capsule membrane 12 from the "radius a". Here, the ratio b/a is defined by the ratio of the "radius b" of the encapsulated region, which is obtained by subtracting the thickness of the capsule membrane 12 from the "radius a", to the "radius a" of the microcapsule 11. The ratio b/a is the ratio of the internal diameter to the external diameter of the microcapsule 11. The internal diameter is obtained by subtracting the doubled value of the thickness of the capsule membrane 12 from the external diameter.

Further, in a situation where the microcapsules 11 are arranged on the surface of the transparent base material 2 as shown in FIG. 3, an area of the region where the light is diffused per unit area is calculated as an effective area ratio. That is, the effective area ratio is a value obtained from a denominator being an area of a fixed region and a numerator being an area of the region where the light is diffused within the fixed region. The effective area ratio can also be recognized as an area ratio between the region where the light is diffused and the region where the light is not diffused. Here, the encapsulated region of the microcapsule 11 is defined to be the region where the light is diffused. The effective area ratio is calculated within the hexagonal area indicated by the broken line 111 in FIG. 3. The effective area ratio is calculated in such a way that the area of the microcapsule 11 excluding the capsule membrane 12 is divided by the hexagonal area indicated by the broken line 111 in FIG. 3. As noted above, the microcapsule 11 is deformed into a hexagonal shape indicated by the broken line 110. The area of the capsule membrane 12 is employed in deriving the effective area ratio, and the value of the area of the capsule membrane 12 does not change significantly when it is calculated assuming that the shape is circular. Therefore, the effective area ratio is calculated assuming that the microcapsule 11 keeps a circular shape. The effective area ratio in terms of the area of the microcapsule 11 excluding the capsule membrane 12 is expressed by the following equation 1.

$$\text{Effective area ratio} = 3 \times \pi \times a^2 \times (b/a)^2 / (6 \times 3^{0.5} \times a^2) \quad (1)$$

Here, a brightness ratio will be explained in terms of a case where the light diffused by the light diffusion particles 15 reaches the viewer and a case where the light directly reaches the viewer without diffusion. It is assumed that parallel light projected to the screen 1 has a spread angle of one degree (0.017 radian). Further, it is assumed that the light diffused by the light diffusion particles 15 spreads in directions in which the light penetrates the screen 1, having the same light intensity in all the directions. "Spreading and having the same light intensity in all the directions" means that the light having the same light intensity spreads hemispherically. It is assumed that brightness of the light directly reaching an observer without diffusion is one [candela/m2] (hereinafter, candela/m2 is represented as "nit"). In this case, the brightness L of the light that reaches the viewer after being diffused by the light diffusion particles 15 is represented by the following equation 2. Here, the circular constant is denoted by $\pi$.

$$\text{Brightness } L = \pi \times (0.017/2)^2 / (\pi \times (\pi/2)^2) = 3.1e-5 \, [nit] \quad (2)$$

The value calculated by Equation 2 is 3.1e-5 [nit], and this value is sufficiently small compared with one [nit]. That is, the brightness of the light that reaches after diffusion is sufficiently small compared with the brightness of the light that reaches without diffusion.

Furthermore, the following explanation will be done using a variance value of brightness V as an index in order to estimate non-uniformity of brightness of the screen. The variance value of brightness V is evaluated by the following equation 3 on the basis of a general evaluation method of a sample variance value. Note that, "e" is an exponential notation and, for example, $1e-1 = 1 \times 10^{-1}$.

$$\text{Variance Value } V = (\text{Effective area ratio} \times 3.1e-5 + (1 - \text{Effective area ratio}) \times 1 - 3.1e-5)^2 \times \text{Effective area ratio} + (\text{Effective area ratio} \times 3.1e-5 + (1 - \text{Effective area ratio}) \times 1 - 1)^2 \times (1 - \text{Effective area ratio}) \quad (3)$$

A sensory evaluation of the image was carried out using the variance value V obtained from Equation 3. In the sensory evaluation method, screens having variance values ranging from 0.10 to 0.16 were used. By a projection display device with a laser light source, image light is projected to screens having respective variance values. Using the screens having different variance values V, about 40 viewers evaluated the degree of image degradation Q on a 10-point scale. In the criterion for the evaluation within the 10-point scale, 0 corresponds to "not annoyed". The more the evaluation value increases, the more the degree of annoyance in terms of the non-uniformity of brightness increases, and the maximum 9 corresponds to "extremely annoyed".

Figure 7:
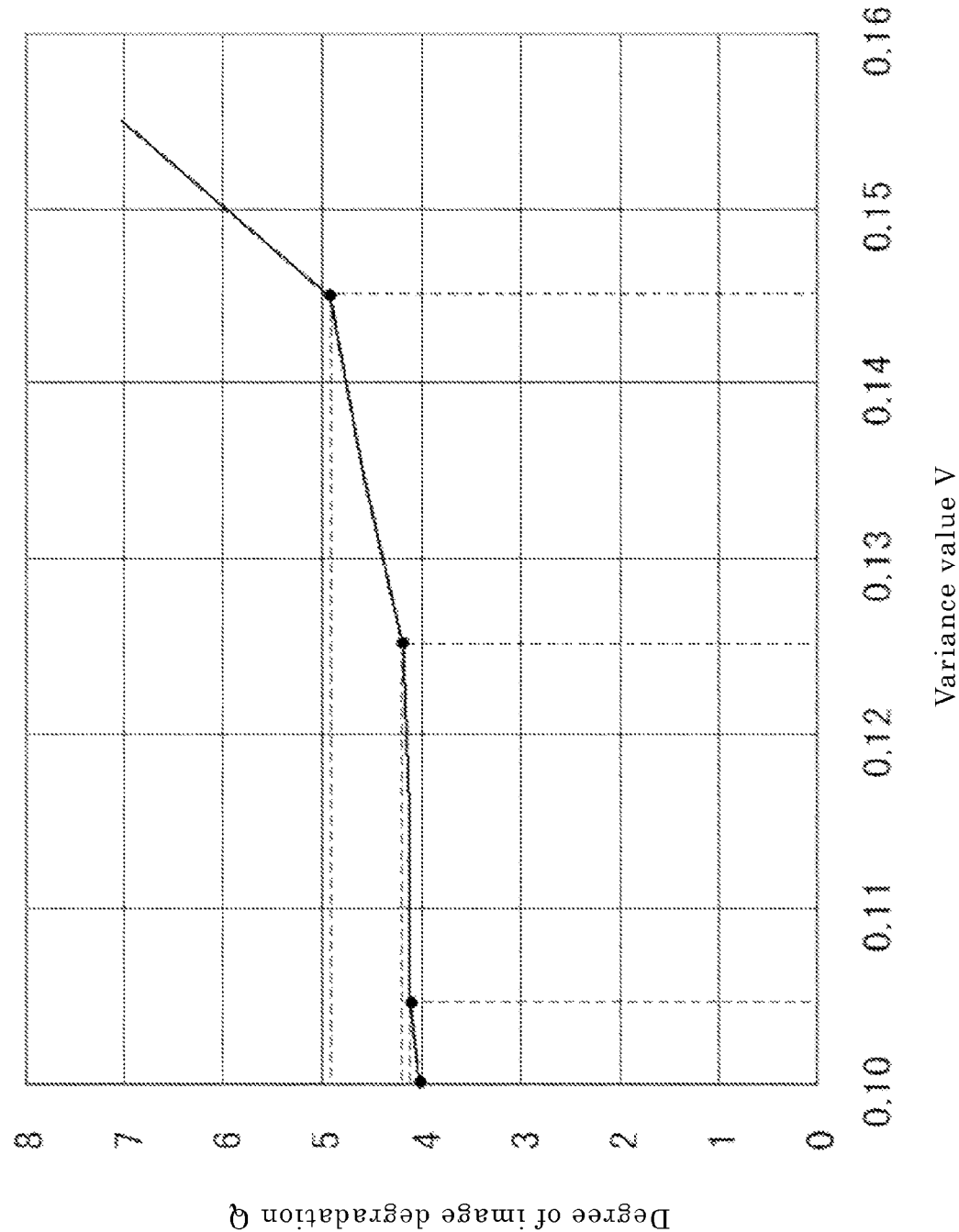
FIG. 7 is a graph showing a relationship between the variance value V and a degree of image degradation Q, in the screen according to Embodiment 1.

FIG. 7 is a graph showing a relationship between the variance value V and the degree of image degradation Q. The horizontal axis shows the variance value V. The vertical axis shows the degree of image degradation Q. The graph shows an average value of the evaluated values by the viewers vs. the variance value of the screen. That is, it indicates that the average value of the degrees of image degradation Q evaluated by the viewers is 4.9 for a screen having the variance value of 0.145. From this result, it is found that the degree of image degradation Q that reflects the non-uniformity of brightness and is evaluated by the viewers increases sharply when the variance value of the non-uniformity of brightness V exceeds 0.145.

Figure 5:
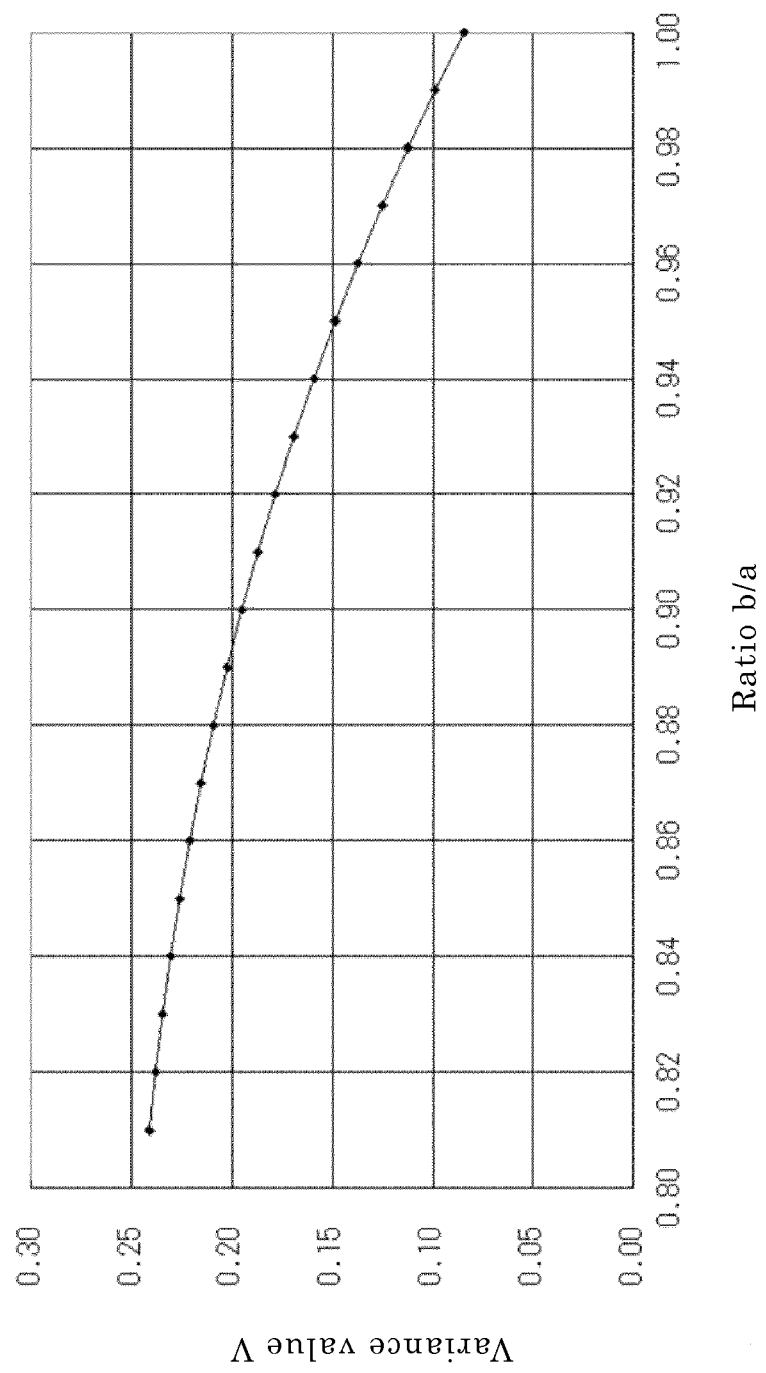
FIG. 5 is a graph showing a relationship between the ratio b/a and a variance value V, in the screen according to Embodiment 1.

FIG. 5 is a graph showing a relationship between the ratio b/a and the variance value of the brightness V. The horizontal axis is the ratio b/a. The "radius a" is the radius of the microcapsule 11. The "radius b" is the radius of the encapsulated region defined by subtracting the thickness of the capsule membrane 12 from the "radius a". The vertical axis shows the variance value V.

In FIG. 5, the more the value in the horizontal axis increases, the more the region where the light is not diffused on the screen 1 decreases. From FIG. 5, it is found that the variance value of the brightness V decreases as the thickness of the capsule membrane 12 relatively decreases. It is found from an experimental result that when the variance value of the brightness V is 0.15 or less, the non-uniformity of brightness is not easily recognized by a viewer. Therefore, the variance value V is preferably 0.145 or less. The non-uniformity of brightness is not easily recognized when the ratio b/a is set to be 0.95 or more. Preferably, if b/a is set to be 0.97 or more, resulting in the variance value to be 0.125 or less, the non-uniformity of brightness is suppressed further. Preferably, if b/a is set to be 0.98 or more, resulting in the variance value to be 0.105 or less, the non-uniformity of brightness is further suppressed, and more preferably, if b/a is set to be 0.99 or more, resulting in the variance value to be 0.10 or less, the non-uniformity of brightness is further suppressed. In terms of the variance value around 0.125, the degree of increment in the degree of image degradation Q is larger at the variance value V being 0.125 or more than at the variance value being 0.125 or less. Further, in terms of the variance value around 0.105, the degree of increment in the degree of image degradation Q is larger at the variance value V being 0.105 or more than at the variance value being 0.105 or less.

The description above is presented for the case when a water-based microcapsule is employed. However, it is similar when an oil-based microcapsule is employed. That is, in the case of an oil-based microcapsule, when a flexible capsule membrane is employed, the oil-based microcapsule is deformed to an approximate hexagonal shape, similar to the water-based microcapsule described using FIG. 3.

The effective area ratio is the area ratio between the region where the light is diffused and the region where the light is not diffused. The effective area ratio is calculated from the "radius a" and the "radius b". From this reason, it is supposed that a region where light is diffused and a region where light is not diffused uniformly exist within a certain region. That is, the case where non light diffusion regions are concentrated in a part of the certain region is not considered.

Next, the non-uniformity of brightness generated in the screen 1 when a capsule 12 is broken will be explained. The encapsulated liquid 16 flows externally from the microcapsule 11 when a capsule 12 is broken. Then the dispersion medium 13 evaporates. After that the light diffusion particles 15 and the broken capsule membrane 12 remain in the broken microcapsule 11.

The light diffusion particles 15 diffuse light and reflect light. The capsule membrane 12 also diffuses light, and the capsule membrane 12 reflects light. The degree of light diffusion by the light diffusion particle 15 depends on the refractive index difference between the light diffusion particle 15 and an object existing in an interface of the light diffusion particle 15.

Originally, the microcapsule 11 has light diffusion property when the light diffusion particle 15 is covered with the dispersion medium 13. However, a binder material or air exists around the light diffusion particles 15 if the dispersion medium 13 has evaporated. Hence, the refractive index difference at the interface of the light diffusion particle 15 increases, and thus the light diffusion particle 15 diffuses light intensely.

Furthermore, the capsule membrane 12 is originally spherical. However, when the capsule membrane 12 is broken, concave and convex shapes of the broken surface and edge shapes, etc. of the broken surface of the capsule membrane 12 are generated. Those shapes have structures that tend to diffuse light. Thus, the capsule membrane 12 diffuses light intensely. The microcapsule 11 is spherical before arranged on the base material 2.

Light transmittance decreases in the broken region of the microcapsule 11 owing to those causes. Thus the brightness on the screen 1 decreases in the region, resulting in the occurrence of the non-uniformity in brightness within the display area of the screen 1.

Here, the relationship between the thickness of the capsule membrane 12 and the fragility D of the microcapsule membrane 12 will be explained. The encapsulated liquid 16 included in the microcapsule 11 is fluid. Further, the capsule membrane 12 is a polymer, and the capsule membrane 12 is considered to be an elastic body. Therefore, the microcapsule 11 tends to have the most stable shape.

When the ink is applied uniformly on the surface of the transparent base material 2, since the ink is liquid, the transparent base material 2 is placed horizontally, and then the ink is applied on it. Because of this, the direction of gravity for the microcapsule 11 is the direction toward the transparent base material 2. The encapsulated liquid 16 is fluid as described before. Thus, when the microcapsule 11 is applied on the transparent base material 2, owing to the gravity, it tends to be deformed from the spherical shape into a shape along the planar shape of the transparent base material 2. It is assumed that there is no capsule membrane 12, and droplets of the encapsulated liquid 16 are dropped onto the transparent base material 2. In this case, the droplets typically spread along the planar shape of the transparent base material 2 owing to the gravity.

As noted above, the capsule membrane 12 restrains the encapsulated liquid 16 from being deformed when the encapsulated liquid 16 tries to spread into the planar shape. That is, the capsule membrane 12 prevents the encapsulated liquid 16 from spreading. Here, the capsule membrane 12 is considered to be a shell-shaped elastic body that is spherical and hollow inside. The modulus of elasticity is a value obtained by dividing a stress induced by an external force by a strain induced by deformation.

When the modulus of elasticity of the capsule membrane 12 is large, the capsule membrane is not deformed even if the encapsulated liquid 16 tries to spread into a planar shape. Because of this, the microcapsule 11 will not change its shape from the spherical one. In contrast, when the modulus of elasticity of the capsule membrane 12 is small, the capsule membrane 12 deforms largely when the encapsulated liquid 16 tries to spread into a planar shape. Thus, the microcapsule 11 is deformed into an approximate planar shape. Here, the modulus of elasticity is a physical property that indicates deformation resistance.

The microcapsule 11 is in a spherical shape when it is in a dispersed state in the ink. The dispersed state in the ink means a state before the microcapsule is applied on the transparent base material 2. However, the microcapsule 11 is deformed owing to the gravity after the application, and thus the microcapsule 11 is deformed into an approximate ellipsoid. First, the encapsulated liquid 16 is filled inside the microcapsule 11 to make the microcapsule be spherical. That is, the inside of the microcapsule 11 is filled with the encapsulated liquid 16 whose volume is equivalent to that of the microcapsule 11 so as for the capsule membrane 12 to be in a state without deflection. In this case, when the microcapsule 11 is deformed into an approximate ellipsoid, a surface area of the microcapsule 11 is increased. This is because a spherical shape is a shape whose surface area is the smallest when the same volume is kept.

Further, the capsule membrane 12 in a spherical shape other than the encapsulated liquid 16 actually tends to change its shape owing to the gravity. However, for the sake of simplicity, the phenomenon will be explained assuming that only the deformation of the encapsulated liquid 16 due to the gravity is considered. That is, since the gravity is constant, it is assumed that the force that makes the microcapsule 11 expand into a planar shape is constant and independent of the thickness of the capsule membrane 12.

This phenomenon can be examined using an equivalent, Hooke's law. Hooke's law is represented by the following equation 4.

Deformation amount of elastic body=Force applied to elastic body/Spring constant of elastic body  (4)

Here, the amount of deformation of elastic body is considered to be a value that indicates how much the microcapsule 11 is deformed. Further, the force applied to the elastic body is considered to be a force that causes the encapsulated liquid 16 to spread into a planar shape. The spring constant of the elastic body is considered as the elasticity of the capsule membrane 12.

Next, the relationship between the thickness of the capsule membrane 12 and the modulus of elasticity of the capsule membrane 12 will be explained. First, it is assumed that a tensile force or a compressive force is applied to an object. When a force is applied to the object, the stress induced on the object is inversely proportional to the cross-sectional area of the object. Further, the amount of deformation induced in the body is inversely proportional to the cross-sectional area of the object. That is, the spring constant of the object with respect to a tensile force is proportional to the cross-sectional area of the object. The spring constant is also referred to as the modulus of elasticity. Here, the capsule membrane 12 will be examined. The capsule membrane 12 has a shape such as a spherical shell, and its cross-sectional area is proportional to the thickness of the capsule membrane 12. That is, the thickness of the capsule membrane 12 is proportional to the modulus of elasticity of the capsule membrane 12.

When the ink including the microcapsule 11 is applied on the transparent base material 2, the encapsulated liquid 16 in the microcapsule 11 tends to spread into a planar shape owing to the gravity. The amount of deformation of the microcapsule 11 is inversely proportional to the modulus of elasticity of the capsule membrane 12. That is, the amount of deformation of the microcapsule 11 is inversely proportional to the thickness of the capsule membrane 12. The amount of deformation of the microcapsule 11 can be considered as an amount of elongation of the capsule membrane 12. That is, the amount of elongation of the capsule membrane 12 is inversely proportional to the thickness of the capsule membrane 12.

Further, the elongation of the capsule membrane 12 is proportional to the tensile stress of the capsule membrane 12 when it is deformed. The capsule membrane breaks when the stress of the capsule membrane 12 reaches more than a certain value. From this reason, when the microcapsule 11 is applied on the transparent base material 2, the fragility D of the microcapsule membrane 12 depending on the gravity is inversely proportional to the thickness of the capsule membrane 12.

Figure 6:
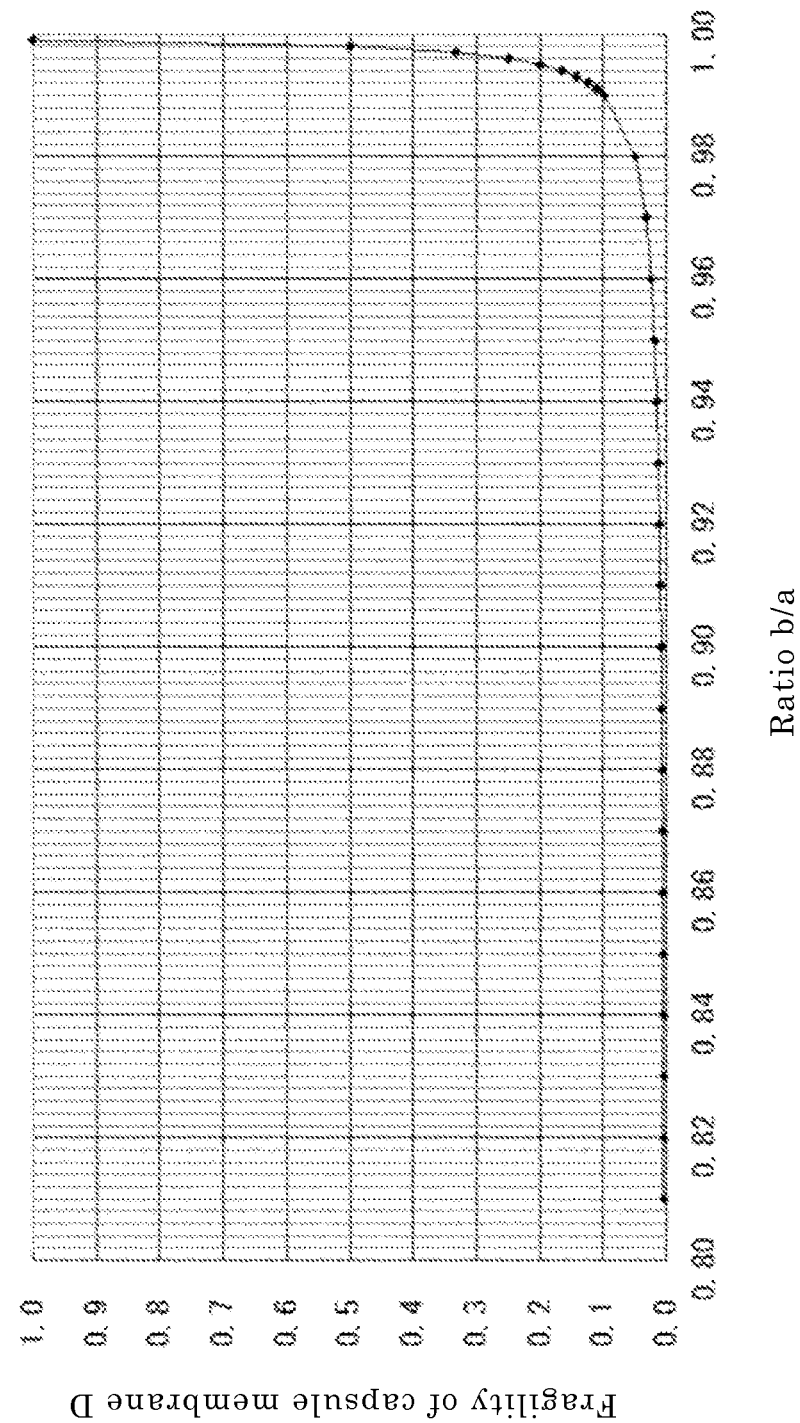
FIG. 6 is a graph showing a relationship between the ratio b/a of the screen and fragility D of a capsule membrane, according to Embodiment 1.

FIG. 6 shows a relationship between the thickness of the capsule membrane 12 and the stress induced in the capsule membrane 12. The horizontal axis is the ratio b/a, similar to FIG. 5. The "radius a" is the radius of the microcapsule 11. The "radius b" is the radius of the encapsulated region defined by subtracting the thickness of the capsule membrane 12 from the "radius a". The vertical axis shows the fragility D of the capsule membrane 12. Here, since the vertical axis showing the fragility D of the capsule membrane 12 is inversely proportional to the thickness of the capsule membrane 12 ("radius a"–"radius b"), the fragility is represented by the ratio, i.e. the inverse number of "a–b", and is set to one when the ratio b/a equals 0.999. The value of the ratio b/a decreases as the thickness of the capsule membrane 12 increases. From FIG. 6, the fragility D of the capsule membrane 12 sharply decreases when the ratio b/a is less than 0.995. That is, the capsule membrane 12 is not easily broken when the ratio b/a is less than 0.995.

In order to suppress this phenomenon, the ratio b/a is set to be 0.995 or less, so that the occurrence of the breakage of microcapsules 11 can be reduced. Preferably, setting the ratio to be 0.9925 can reduce the occurrence of the breakage of microcapsules 11. Further, more preferably, setting the ratio to be 0.991 or less can reduce the occurrence of the breakage of microcapsules 11.

In the screen 1, the ratio (b/a), which is the "radius b" defined by subtracting the thickness of the capsule membrane 12 from the "radius a" of the microcapsule 11 over the "radius a" of the microcapsule 11, ranges from 0.95 to 0.995. When the values are expressed in terms of the area, the ratio is the "radius b" squared over the "radius a" squared, and thus, in the cross-sectional area of the microcapsule 11 projected in the direction perpendicular to the surface of the base material 2 on which microcapsules 11 are planarly arrayed, the ratio, the area of the encapsulated region over the area of the microcapsule 11 ranges from 0.9025 to 0.990.

When the capsule membrane 12 is broken, the light diffusion particles 15 flow outside from the microcapsule 11, and the encapsulated liquid 16 also flows outside from the microcapsule 11. When the capsule membrane 12 is broken, the image light is diffused by the light diffusion particles 15, and the image light is also diffused by the capsule membrane 12. That is, image light that is reflected without penetrating the screen 1 occurs. Because of this, the non-uniformity of brightness is generated on the screen 1. In addition, the light diffusion particles 15 fall into a state where they are not dispersed within the dispersion medium 13. Therefore, since the light diffusion particles 15 cannot move freely, the effect in reducing the scintillation cannot be obtained.

Further, when the microcapsule 11 is being dried, it may be broken if the thickness of the capsule membrane 12 is small. When the microcapsule is dried, the moisture evaporates from the capsule membrane 12, and thus the capsule membrane contracts. Then, as described before, the adjacent microcapsules 11 are deformed into an approximate hexagonal shape, while filling the gaps.

The encapsulated liquid 16 is filled inside the microcapsule 11 to make the microcapsule 11 be spherical. That is, the inside of the microcapsule 11 is filled with the encapsulated liquid 16 whose volume is equivalent to that of the microcapsule 11 so as for the capsule membrane 12 to be in a state without deflection. Then, the volume of the encapsulated liquid 16 in the microcapsule 11 is not changed, because a spherical shape is a shape whose surface area is the smallest when the same volume is kept. That is, the surface area of the capsule membrane 12 is increased owing to the deformation of the microcapsule 11. Thus, the stress induced in the capsule membrane 12 is increased, resulting in the increase in the possibility of breakage of the capsule membrane 12.

As described above, there is a possibility that the breakage of the capsule membrane 12 occurs for the following two reasons. The first reason is that, since the surface area is increased by the change in the shape from the spherical shape to the hexagonal column due to the gravity, the stress induced in the capsule membrane 12 is increased. The second reason is that the stress induced in the capsule membrane 12 is increased owing to the contraction of the capsule membrane 12 when it is dried.

As explained above, by controlling the ratio b/a within a certain range, the non-uniformity of brightness in the screen 1 can be reduced. The "radius a" is the radius of the microcapsule 11. The "radius b" is the radius of the encapsulated region defined by subtracting the thickness of the capsule membrane 12 from the "radius a".

That is, a configuration has been described in which parallel light perpendicular to the image display surface of the screen 1 is projected as image light, and then the light that is diffused on the screen 1 and penetrates therethrough is recognized as an image by a viewer. Note that, a similar effect can be obtained when image light being slanted to the screen 1 is projected. The image light being slanted means such a case in which the image light is projected while spreading, or parallel light having a slanted angle to the screen 1 is projected.

For example, it is assumed that the image light is projected on the screen 1 while spreading. If there is an area where light is not diffused within the display area of the screen 1, a part of the image light is not diffused and penetrates the screen 1. In this case, depending on a positional relationship among a viewer, screen 1, an optical system, and the like, the viewer recognizes the non-uniformity of brightness. The optical system means a projector that projects image light, or the like. Further, the non-uniformity of brightness is generated as well when there is an area where the microcapsules 11 are broken.

Note that, the microcapsule 11 having a diameter ranging from 20 µm to 150 µm is easily manufactured. Because of this, the diameter of the microcapsule 11 preferably ranges from 20 µm to 150 µm. The microcapsule 11 having a diameter ranging from 50 µm to 120 µm is more easily manufactured. Because of this, it is further preferable that the diameter of the microcapsule 11 ranges from 50 µm to 120 µm. Note that, "µm" a notation of the unit for micrometer.

Further, the diameter of the microcapsule 11 manufactured is selected within the range from 20 µm to 300 µm. Using the selected microcapsules 11, the gaps among microcapsules 11 adjacent to each other on the transparent base material 2 can be minimized. The gaps among the selected microcapsules 11 are in such a degree that can reduce the non-uniformity of brightness that a viewer recognizes.

Further, the diameter of the microcapsule 11 is preferably selected within the range from 20 µm to 200 µm. That is, the diameter of the microcapsule ranges from 20 µm to 300 µm. It is further preferable that the diameter of the microcapsule 11 is selected within the ranges from 40 µm to 150 µm. Selecting microcapsules 11 in such a narrow range leads to a further decrease in the gaps among the microcapsules 11. The non-uniformity of brightness that a viewer recognizes can be reduced by selecting microcapsules 11 in such a narrow range.

Note that, the base material has been assumed to be the transparent base material 2 in the explanation of the embodiment. This means that light penetrates the base material. That is, it means that the base material is light-transmissive. The degree of transparency can be selected depending on the purpose of use. Here, the degree of transparency is a light penetration rate.

Embodiment 2

Figure 8:
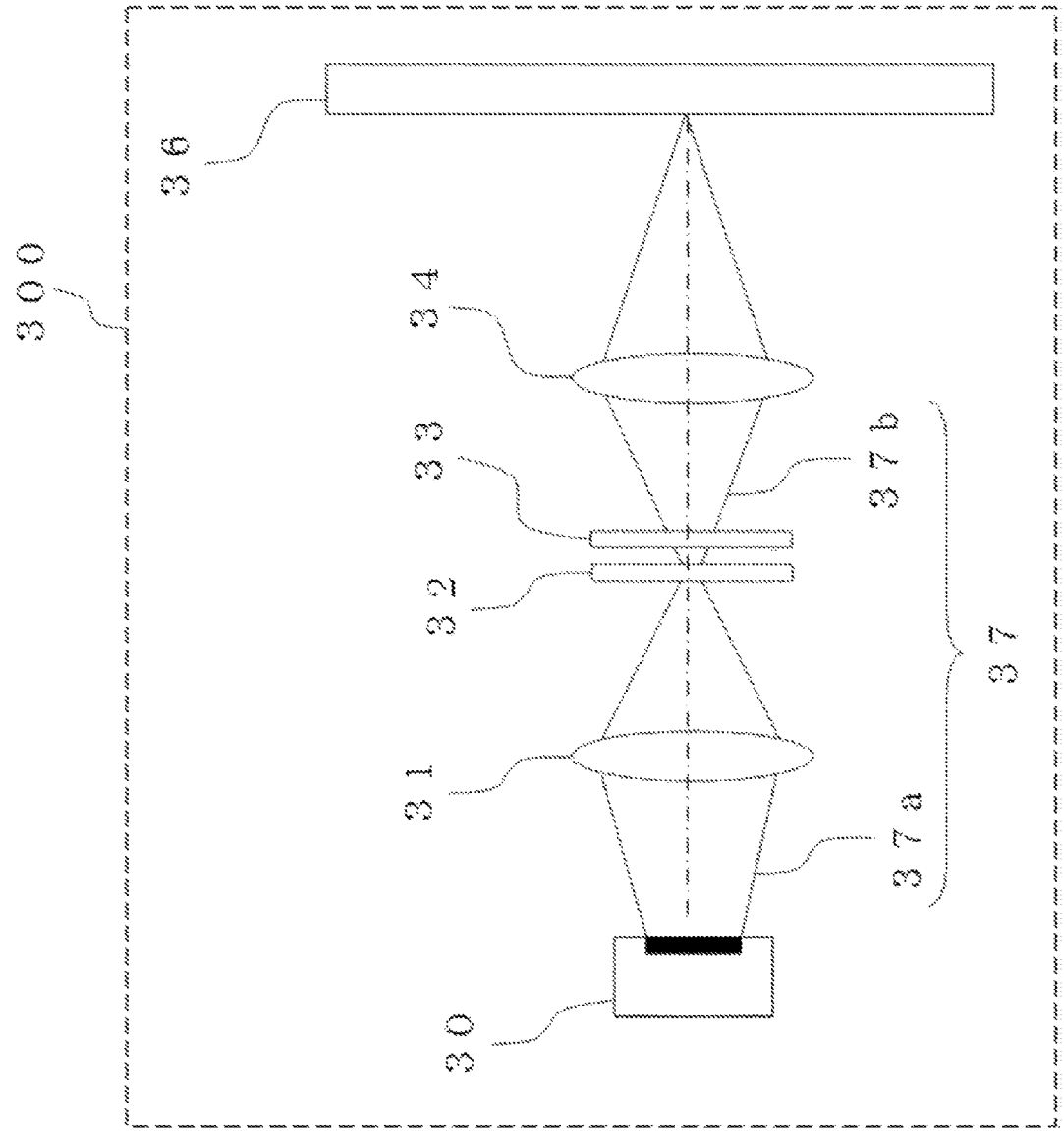
FIG. 8 is a configuration diagram showing a configuration of a display device according to Embodiment 2.

The screen for image projection using the microcapsules 11 has been explained in Embodiment 1. In Embodiment 2, display devices 300 and 310 using the microcapsules 11 will be explained. FIG. 8 is a configuration diagram showing a configuration of the display device 300.

A light source 30 emits projection light 37a. The projection light 37a emitted from the light source 30 penetrates an illumination optical system 31 and illuminates an image display device 32. The image display device 32 is, for example, a digital micromirror device (hereinafter abbreviated as DMD).

The DMD is a device in which movable micromirrors are formed on an integrated circuit. A mirror surface of each micromirror can be tilted. When the mirror is in the state "ON", the light from the light source is projected to the outside (for example, the screen), and when the mirror is in the state "OFF", the light is reflected to an absorber and is not projected to the outside. The state of "the mirror being ON" corresponds to the state when an image is displayed. The state of "the mirror being OFF" corresponds to the state when an image is not displayed. Therefore, the light projection can be controlled for each image pixel by driving each mirror independently. That is, the DMD generates image light. "The image light" is the light including image information. Note that, it is shown in FIG. 8 for the simplicity of the configuration diagram that the projection light 37a penetrates the image display device 32, and turns into the image light 37b. The projection light 37a and the image light 37b are collectively called light 37.

The image light 37b generated by the image display device 32 penetrates the projection optical system 34 and is projected to the screen 36. In the display device 300, a micro optical element 33 is disposed in the subsequent stage of the image display device 32. "The subsequent stage" means optically subsequent. In this case, it means after the generation of the image light 37b by the image display device 32.

The micro optical element 33 is configured in the same manner as the screen 1 described in Embodiment 1. That is, the microcapsule 11 contains the encapsulated liquid 16 inside the capsule membrane 12. The microcapsules 11 are planarly arrayed on the base material 2. The encapsulated liquid 16 includes the light diffusion particles 15 that scatter light and the dispersion medium 13 that disperses the light diffusion particles 15. The microcapsule 11 is spherical before arranged on the transparent base material 2. The ratio (b/a), which is the "radius b" defined by subtracting the thickness of the capsule membrane 12 from the "radius a" of the microcapsule 11 over the "radius a" of the microcapsule 11, ranges from 0.95 to 0.995. When the values are expressed in terms of the area, the ratio is the "radius b" squared over the "radius a" squared. In the cross-sectional area of the microcapsule 11 projected in the direction perpendicular to the surface of the base material 2 on which microcapsules 11 are planarly arrayed, the ratio of the area of the encapsulated region to the area of the microcapsule 11, ranges from 0.9025 to 0.990. With the effective area ratio being a ratio of the area of the region where light is diffused to a unit area, the variance value V shown in Embodiment 1 is represented by Equation 3. Equation 3 is as follows.

$$V = (\text{Effective area ratio} \times 3.1e{-}5 + (1 - \text{Effective area ratio}) \times 1 - 3.1e{-}5)^2 \times \text{Effective area ratio} + (\text{Effective area ratio} \times 3.1e{-}5 + (1 - \text{Effective area ratio}) \times 1 - 1)^2 \times (1 - \text{Effective area ratio})$$

The diameter of the microcapsule 11 manufactured is selected within the range from 20 µm to 300 µm. That is, the diameter of the microcapsule 11 ranges from 20 µm to 300 µm. The image light 37b penetrates the micro optical element 33, so that the scintillation of the image can be reduced.

"The scintillation" is a phenomenon in which, when the projected light goes through the screen and propagates into eyes of a viewer, rays of light going through different optical passes interfere on the retina of viewer's eyes and generate interference fringes. When the scintillation occurs, the displayed image glares to the viewer.

The reason why the scintillation is reduced when the micro optical element 33 is disposed in the subsequent stage of the image display device 32 is that the image display device 32 and the screen 36 are in an optically conjugate relationship. "The optical conjugation" means the relationship in which a ray of light emitted from a point is imaged on the other one point. In the vicinity of the subsequent stage of the image display device 32, the image light 37b is diffused by the micro optical element 33. Since the screen 36 and the micro optical element 33 are in the optically conjugate relationship, the larger the angle of divergence of the image light 37b emitted from the micro optical element 33, the larger the angle of convergence of the incident light to the screen 36. As the angle of convergence of the incident light to the screen 36 increases, the light emitted from the screen 36 tends to be diffused. In this way, the larger the angle of convergence of the incident light to the screen 36 is, the higher the diffusibility becomes, and thus the glare phenomenon is suppressed. That is, the interference of the image light 37b after passing through the screen 36 can be reduced.

Also in this case, the non-uniformity of brightness that a viewer recognizes can be reduced by setting the relationship between the diameter of the microcapsule 11 and the capsule membrane 12 to the same relationship as Embodiment 1. That is, since the variance value is preferably 0.15 or less, it is desirable that the ratio b/a is set to be 0.95 or more. Preferably, it is set to be 0.98 or more, and more preferably, it is set to be 0.99 or more.

Further, the capsule membrane 12 is easily broken when the ratio b/a is larger than 0.995. In order to suppress this phenomenon, the ratio b/a is set to be 0.995 or less, so that the occurrence of the breakage of the microcapsule 11 can be reduced. Preferably setting it to be 0.9925 can reduce the occurrence of the breakage of the microcapsule 11. More preferably setting it to be 0.991 or less can reduce the occurrence of the breakage of the microcapsule 11.

The microcapsule 11 having a diameter ranging from 20 μm to 150 μm is easily manufactured. Because of this, the diameter of the microcapsule 11 preferably ranges from 20 μm to 150 μm. The microcapsule 11 having a diameter ranging from 50 μm to 120 μm is more easily manufactured. Because of this, it is further preferable that the diameter of the microcapsule 11 ranges from 50 μm to 120 μm.

Note that, it is configured such that the image light 37b generated by the image display device 32 penetrates the micro optical element 33 in this case. However, it may be configured such that the projection light 37a that has penetrated the micro optical element 33 is emitted to the image display device 32. Further, in Embodiment 2, a reflection type is adopted for the image display device 32. However, the same effect can be obtained using a transmission type device. A transmission type of the image display device 32 is, for example, LCOS (Liquid Crystal On Silicon). "LCOS" is a micro-projection technology or a micro-display technology employed in projectors or rear projection televisions. There is a DLP (Digital Light Processing: a registered trade mark) projector that is a similar reflection type device technology. However, different from the DLP, LCOS uses a liquid crystal instead of independent mirrors.

When two micro optical elements 33 each are disposed at a front side and a rear side of the image display device 32, the scintillation reduction effect can be further enhanced. Since a temporal change in the interference of light is increased and the non-uniformity of brightness is averaged when using two micro optical elements 33, it is obvious that the non-uniformity of brightness that a viewer recognizes can be reduced.

Furthermore, when the screen 1 described in Embodiment 1 is employed in the display device 300, the scintillation can be further reduced. However, in a case where the number of components is reduced so as to reduce the cost, a general type of screen is used as the screen 36 and only the micro optical element 33 may be used.

Figure 9:
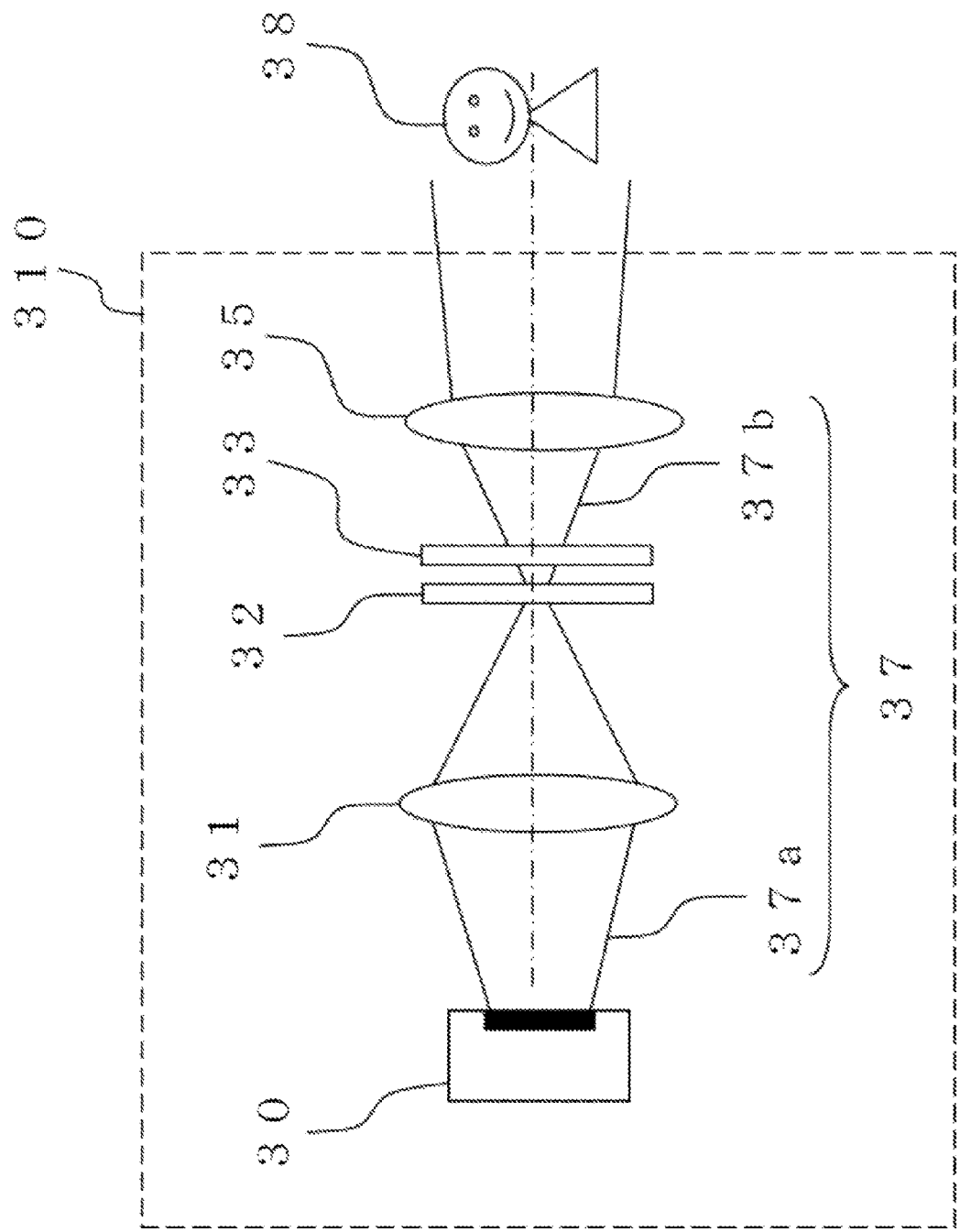
FIG. 9 is a configuration diagram showing a configuration of a display device according to Embodiment 2.

The projection display device 300, in which an image is projected on the screen 36, has been explained. The present invention is not limited to this, and a similar effect can be obtained even when the invention is applied to a display device 310 in which the screen 36 as shown in FIG. 9 is not used. FIG. 9 is a configuration diagram showing a configuration of the display device 310. FIG. 9 shows a type of display device in which an image of the image display device 32 is perceived as a virtual image by a viewer 38. For example, a head up display can be given as an example for the display device 310.

The light source 30, the illumination optical system 31, the image display device 32, and the micro optical element 33 of the display device 310 each are the same as those of the display device 300. The projection optical system 35 differs from the projection optical system 34 in that it is an optical system in which a real image is not projected on the screen 36, but a virtual image is projected.

In this case, the viewer 38 watches a virtual image of the image display device 32. That is, if the directionality of the image light 37b emitted from the image display device 32 is high, rays of light interfere with each other, resulting in an increased brightness, and the scintillation occurs. The micro optical element 33 diffuses the image light 37b, so that the interference of the image light 37b can be reduced. Because of this, the scintillation generated in the image display device 32 can be reduced.

In addition, in each embodiment described above, shapes such as a sphere, an ellipsoid, and a hexagonal column are quoted. "The spherical shape" represents the shape when the inside of the microcapsule 11 is filled with the encapsulated liquid 16 whose volume is equivalent to that of the microcapsule 11 so as for the capsule membrane 12 to be in a state without deflection. "The ellipsoid" is quoted as an example of the most imageable shape when the microcapsule 11 is deformed. "The hexagonal column" is quoted as a shape within a range in consideration of the diameter variation of microcapsules 11 and the placement variation of microcapsules 11. Furthermore, "the uniformity" is quoted meaning that the image is uniform to the extent that the viewer does not recognize the non-uniformity of brightness as degradation of the image. "The parallel light" is quoted as parallel light including a range in consideration of the variation of optical components. Because of these, the sphere, the ellipsoid, the hexagonal column, the uniformity, and the parallel light described in the claims are to be construed considering the ranges described above.

Note that, although the embodiments of the present invention have been described above, the invention is not limited to these embodiments.

EXPLANATION OF REFERENCE CHARACTERS 1 screen; 11 microcapsule; 12 capsule membrane; 13 dispersion medium; 15 light diffusion particle; 16 encapsulated liquid; 2 transparent base material; 300, 310 display devices; 30 light source; 31 illumination optical system; 32 image display device; 33 micro optical element; 34, 35 projection optical systems; 36 screen; 37 light; 37a projection light; 37b image light; 38 viewer; 110,111 broken lines; "a", "b" radii; b/a ratio; D fragility of capsule membrane; V variance value; Q degree of image degradation.

The invention claimed is:

1. A screen comprising:
microcapsules each including encapsulated liquid in an encapsulated region that is a region of an inside of a capsule membrane; and
a base material on which the microcapsules are planarly arranged; wherein
the encapsulated liquid includes light diffusion particles that scatter light and a dispersion medium that disperses the light diffusion particles,
a ratio of an area of the encapsulated region to an area of each of the microcapsules ranges from 0.9025 to 0.990 in a cross-sectional area of the microcapsule projected in a direction perpendicular to a surface of the base material on which the microcapsules are planarly arranged,
wherein, with an effective area ratio being the ratio of an area of a region where light is diffused, to a unit area of the screen, and a variance value V defined as, $$V = (\text{Effective area ratio} \times 3.1 \times 10^{-5} + (1 - \text{Effective area ratio}) \times 1 - 3.1 \times 10^{-5})^2 \times \text{Effective area ratio} + (\text{Effective area ratio} \times 3.1 \times 10^{-5} + (1 - \text{Effective area ratio}) \times 1 - 1)^2 \times (1 - \text{Effective area ratio}),$$

the variance value V is 0.15 or less.

2. The screen according to claim 1,
wherein a diameter of the microcapsule ranges from 20 μm to 300 μm.

3. A display device comprising:
the screen according to claim 2.

4. A display device comprising:
the screen according to claim 1.

5. The screen of claim 1 wherein the microcapsules are arranged so that one of the microcapsules is surrounded by six microcapsules which form a regular hexagon in a case where the microcapsules are viewed in the direction perpendicular to the surface of the base material so as to minimize gaps among the microcapsules.

6. An optical element comprising:
plural microcapsules each including encapsulated liquid in an encapsulated region that is a region of an inside of a capsule membrane; and
a base material on which the microcapsules are planarly arranged; wherein
the encapsulated liquid includes light diffusion particles that scatter light and a dispersion medium that disperses the light diffusion particles, and
a ratio of an area of the encapsulated region to an area of each of the microcapsules ranges from 0.9025 to 0.990 in a cross-sectional area of the microcapsule projected in a direction perpendicular to a surface of the base material on which the microcapsules are planarly arranged,
wherein, with an effective area ratio being the ratio of an area of a region where light is diffused, to a unit area of the optical element, and a variance value V defined as, $$V = (\text{Effective area ratio} \times 3.1 \times 10^{-5} + (1 - \text{Effective area ratio}) \times 1 - 3.1 \times 10^{-5})^2 \times \text{Effective area ratio} + (\text{Effective area ratio} \times 3.1 \times 10^{-5} + (1 - \text{Effective area ratio}) \times 1 - 1)^2 \times (1 - \text{Effective area ratio}),$$

the variance value V is 0.15 or less.

7. The optical element according to claim 6,
wherein a diameter of the microcapsule ranges from 20 μm to 300 μm.

8. A display device comprising:
the optical element according to claim 7.

9. A display device comprising:
the optical element according to claim 6.

10. The optical element of claim 6 wherein the microcapsules are arranged so that one of the microcapsules is surrounded by six microcapsules which form a regular hexagon in a case where the microcapsules are viewed in the direction perpendicular to the surface of the base material so as to minimize gaps among the microcapsules.

* * * * *